US008873391B2

(12) United States Patent
Brown et al.

(10) Patent No.: US 8,873,391 B2
(45) Date of Patent: Oct. 28, 2014

(54) METHOD AND SYSTEM FOR COORDINATING ACCESS TO A BARRAGE RELAY NETWORK

(75) Inventors: Thomas A Brown, Cardiff by the Sea, CA (US); Thomas R Halford, Manhattan Beach, CA (US); Mark L Johnson, Poway, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 173 days.

(21) Appl. No.: 13/480,387

(22) Filed: May 24, 2012

(65) Prior Publication Data
US 2013/0315131 A1 Nov. 28, 2013

(51) Int. Cl.
*H04L 12/801* (2013.01)
(52) U.S. Cl.
CPC ..................................... *H04L 47/15* (2013.01)
USPC ......................................................... 370/231
(58) Field of Classification Search
CPC .......... H04L 47/00; H04L 47/10; H04L 47/14; H04L 47/15
USPC ................................................. 370/229–231
See application file for complete search history.

(56) References Cited

U.S. PATENT DOCUMENTS

| | | | | |
|---|---|---|---|---|
| 2002/0041595 | A1* | 4/2002 | Delvaux | 370/392 |
| 2002/0150095 | A1* | 10/2002 | Sherman | 370/389 |
| 2004/0240422 | A1 | 12/2004 | Kim | |
| 2005/0105524 | A1* | 5/2005 | Stevens et al. | 370/389 |
| 2008/0273518 | A1* | 11/2008 | Pratt et al. | 370/345 |
| 2009/0313528 | A1 | 12/2009 | Chugg et al. | |

FOREIGN PATENT DOCUMENTS

| | | |
|---|---|---|
| EP | 1 764 961 A1 | 3/2007 |
| WO | 2013/176934 A1 | 11/2013 |

OTHER PUBLICATIONS

International Search Report and Written Opinion for PCT Application No. PCT/US2013/041040, mailed Oct. 22, 2013, 10 pages.
Andrews, J. et al., "Rethinking information theory for mobile ad hoc networks," *IEEE Transactions on Information Theory*, vol. 46, No. 12, pp. 94-101, Dec. 2008.
Blair, A. et al., "Barrage relay networks for cooperative transport in tactical MANETs," in *Proc. IEEE Military Communications Conference*, San Diego, CA, Nov. 2008.
Calinescu, G., "Computing 2-hop neighborhoods in ad hoc wireless networks," in *Proc. 2nd Int'l Conf. Ad Hoc, Mobile, and Wireless Networks (ADHOC-NOW 2003)*, Montreal, Canada, Oct. 2003.
Chlamtac, I. et al., "Mobile ad hoc networking: imperatives and challenges," *Ad Hoc Networks*, vol. 1, No. 1, pp. 13-64, Jul. 2003.
Crow, B. P. et al., "IEEE 802.11 wireless local area networks," *IEEE Communications Magazine*, vol. 35, No. 9, pp. 116-126, Sep. 1997.

(Continued)

*Primary Examiner* — Kerri Rose
(74) *Attorney, Agent, or Firm* — Kilpatrick Townsend & Stockton LLP

(57) ABSTRACT

Methods for coordinating access to a barrage relay networks are disclosed. For example, one disclosed method includes: receiving, by a first node, a first message from a second node on a network; suppressing transmission of messages by the first node; receiving, by the first node, a second message corresponding to the first message or waiting a sufficient amount of time without receipt of the second message; reactivating transmission of the messages by the first node.

26 Claims, 7 Drawing Sheets

(56) References Cited

OTHER PUBLICATIONS

Halford, T. R. and Chugg, K. M., "Barrage relay networks," in *IEEE Information Theory and Applications Theory Workshop (ITA)*, La Jolla, CA, Feb. 2010.

Halford, T. R. et al., "Barrage relay networks: System and protocol design," in *Proc. IEEE Personal, Indoor, and Mobile Radio Conference (PIMRC)*, Istanbul, Turkey, Sep. 2010.

Lee, D. K. and Chugg, K. M., "Pragmatic cooperative diversity communications," in *Proc. IEEE Military Communications Conference*, Washington, DC, Oct. 2006.

Perkins, C. E. and Bhagwat, P., "Highly dynamic destination-sequence distance-vector routing (DSDV) for mobile computers," in *Proc. ACM Special Interest Group on Data Communications*, pp. 234-234, London, United Kingdom, Sep. 1994.

Perkins, C. E. and Royer, E. M., "Ad hoc on-demand distance vector routing," in *Proc. IEEE Workshop on Mobile Computing Systems and Applications*, pp. 90-100, New Orleans, LA, Feb. 1999.

Ramanathan, R., "Challenges: A radically new architecture for next generation mobile ad hoc networks," in *Proc. ACM/IEEE International Conf. on Mobile Computing and Networking*, pp. 132-139, Cologne, Germany, Aug. 2005.

\* cited by examiner

METHOD AND SYSTEM FOR COORDINATING ACCESS TO A BARRAGE RELAY NETWORK

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates to systems and methods for coordinating transmissions from a plurality of data sources in an ad hoc wireless communications network.

BACKGROUND

The use of networks and mobile networks has grown exponentially in recent years. Networks transmit blocks of data between locations on the networks called nodes. As the complexity and number of nodes on a network goes up, so does the risk of collisions on the network. Accordingly, there is a need for coordinating access to a barrage relay network.

SUMMARY

Embodiments of the present invention include methods and systems for coordinating access to a barrage relay network. For example, in one embodiment, a method for coordinating access to a barrage relay network comprises: receiving, by a first node or communications node (hereinafter "node"), a first message from a second node on a network; suppressing transmission of messages by the first node; receiving, by the first node, a second message corresponding to the first message or waiting a sufficient amount of time without receipt of a second message; reactivating transmission of messages by the first node.

These illustrative embodiments are mentioned not to limit or define the limits of the present subject matter, but to provide examples to aid in the understanding thereof. Illustrative embodiments are discussed in the Detailed Description and further examples are provided there. Advantages offered by various embodiments may be further understood by examining this specification and/or by practicing one or more embodiments of the claimed subject matter.

DETAILED DESCRIPTION

Mobile ad hoc networks ("MANETs") are the focus of considerable research and development. MANETs can be distinguished from other classes of wireless networks—such as satellite, cellular, and Wireless Local Area Networks ("WLANs")—by a lack of dependence on fixed infrastructure. If a source node wishes to send data to a distinct destination node (or to a plurality of destination nodes), but cannot do so via a direct link (due to, for example, a large spatial separation), then a multi-hop communication pathway can be established through a plurality of intervening nodes that provide a relay function. A feature of a MANET is that at any time, any node can act as a source, destination, or relay for data transmission.

Wireless network design has traditionally followed the layered paradigm that was pioneered for wired networks (e.g., the Internet), wherein the network architecture is divided into a stack of protocols. In the Open Systems Interconnection Reference Model ("OSI Model"), the network architecture is divided into seven layers ranging from the Physical Layer ("Layer 1") at the bottom, which defines the node air interface between a device and the physical medium, to the Application Layer ("Layer 7") at the top, which defines the operation of such high-level protocols as the File Transfer Protocol and Hypertext Transfer Protocol. Each protocol layer in the OSI Model provides well-defined services to the layer above it and requests services from the layer below. In the language of computer science, the instance of a protocol at Layer 2 of one node communicates with the instance of that same protocol at Layer 2 of another node, and so on.

Layer 2 Protocol Design

Layers 1 and 2 of the OSI Model are called the Physical Layer and Data Link Layer, respectively. In such an embodiment, Layer 1 defines the direct links between the nodes that comprise the network, and Layer 2 includes the Medium Access Control ("MAC") sub-layer. In a wireless network, the MAC sub-layer is responsible for coordinating access to the physical medium—as defined by Layer 1—so as to avoid transmissions from distinct nodes from interfering with one another.

Carrier Sense Multiple Access with Collision Avoidance ("CSMA/CA") may be used in the IEEE 802.11 WLAN standards. In basic CSMA/CA, a source node "S" that wishes to transmit data first tries to detect the presence of a signal from another node. If no such signals are detected, then the sensed medium is said to be "idle" and node S begins transmission. Otherwise, the sensed medium is "busy" and node S waits a random amount of time (called a "backoff period") before sensing the channel again.

Figure 1:
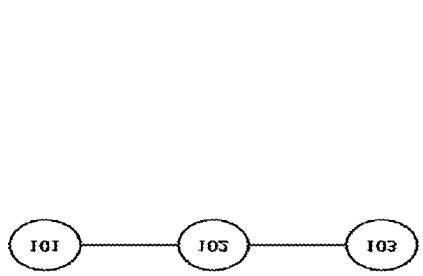
FIG. 1 is an example of a network topology according to one embodiment of a system for coordinating access to a barrage relay network.

The basic CSMA/CA protocol suffers from a hidden node problem (or hidden terminal problem), which is illustrated in FIG. 1. In the network shown in FIG. 1, the node represented by the circle labeled 102 (hereafter "node 102") can communicate via direct links to nodes 101 and 103 (represented by lines), yet no direct link connects nodes 101 and 103. In some embodiments, at an instant in time t, none of the nodes are transmitting. In such an embodiment, at time t, node 101 wishes to transmit data to node 102. Node 101 therefore senses the medium, detects no other signals, and begins transmitting. In such an embodiment, if during this transmission from node 101 to node 102, node 103 wishes to initiate its own transmission to node 102, node 103 would sense the medium as "idle" since the transmissions from node 101 are not received at node 103. Node 103 would therefore begin transmitting to node 102. The simultaneous transmissions from nodes 101 and 103 would then interfere with one another at node 102 such that neither transmission would be properly received.

In some embodiments, this problem can be addressed via a request-to-send ("RTS")/clear-to-send ("CTS") mechanism, the purpose of which is to ensure that the medium is "idle" at both the transmitting and receiving node of a given data transmission For example, in one embodiment, the transmission of data from node 101 to node 102 would have been preceded by the following message exchange: (i) node 101 would send an RTS message indicating its desire to transmit data to node 102 ("$RTS_{101 \to 102}$"); (ii) node 102 would respond with a CTS message indicating that it can indeed receive data ("$CTS_{102 \to 101}$") since the medium is sensed to be idle at node 102 at time t.

The exchange of messages $RTS_{101 \to 102}$ and $CTS_{102 \to 101}$ between nodes 101 and 102 can prevent the interference via two mechanisms. First, in the likely event that node 103 successfully receives message $CTS_{102 \to 101}$, it then becomes aware of the data transmission between node 101 and node 102 and suppresses its own request to send message ("$RTS_{103 \to 102}$") until that data transmission is complete. Second, if for some reason message $CTS_{102 \to 101}$ is not successfully received at node 103, then the message $RTS_{103 \to 102}$ will be ignored by node 102 (i.e., no corresponding CTS is transmitted) and node 103 will wait a random amount of time before sending a subsequent RTS.

Layer 3 Protocol Design

Layer 1 of the OSI Model defines the direct links between nodes that comprise the network while Layer 2 coordinates access to those links at each node. Layer 3 of the OSI model, the "Network Layer," may be tasked primarily with packet routing in MANETs. For example, in one embodiment a data packet from node "S" may be sent to node "D." Unless S and D are neighbors—i.e., unless a direct link exists between nodes S and D—this packet will have to be relayed by one or more intermediate nodes in order to complete a "multi-hop" transmission. When a packet from S to D is received by a given node "X," it consults a routing table to determine whether it should forward that packet (i.e., whether it is part of a route from S to D).

Figure 2:
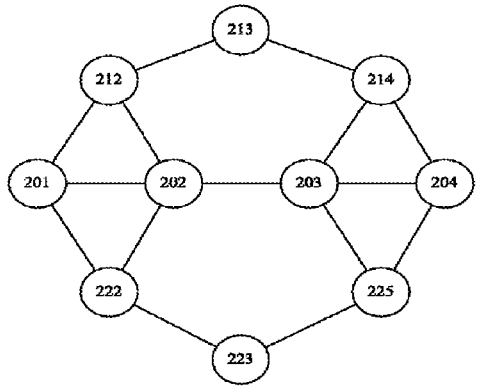
FIG. 2 is another example of a network topology according to one embodiment of a system for coordinating access to a barrage relay network.

The concept of multi-hop routing is illustrated in FIG. 2. As with FIG. 1, labeled circles represent nodes and the lines connecting those circles define direct links in FIG. 2. In one embodiment, routes are defined via a shortest path criteria; for example, the route 201→202→203→204 is used for multi-hop transmission from node 201 to node 204 since this is the only 3-hop path between these nodes (and no shorter path exists). In such an embodiment, when node 201 transmits data packets destined for node 204, those packets are thus forwarded by node 202, but ignored by nodes 212 and 222, and so on.

Routing tables can be maintained either proactively (e.g., the destination-sequenced distance-vector, or "DSDV" routing protocol) or reactively (e.g., the ad hoc on-demand vector, or "AODV" routing protocol). Proactive routing protocols maintain time-varying routes from all nodes, to all nodes, at all nodes, via the periodic transmission of control information. Reactive protocols update routing tables only as needed.

Layer 3 routes need not be restricted to unicast transmission (i.e., distinct source node/destination node pairs). In some embodiments MANET traffic patterns also include multicast data—in which a single source node transmits to a plurality of destination nodes—and broadcast data—in which a single source node transmits to all other nodes in the network. Further, in some embodiments, multicast routes are described by a minimal spanning tree that includes the source and all destination nodes in a given multicast group.

Introduction to Barrage Relay Networks

In some embodiments, the control overhead required to maintain Layer 2 and 3 functionality (e.g., RTS/CTS messages, backoff periods, routing table updates) has been shown to consume as much as 99% of bandwidth. Furthermore, the per-packet and per-hop contention delays introduced by traditional Layer 2 protocols (e.g., CSMA/CA with RTS/CTS) can result in unacceptable delays for multi-hop, latency-critical traffic such as voice and real-time video.

A network that can support cooperative, spatially contained flooding mechanism, called cooperative transport can alleviate several of the aforementioned problems. One example of such a cooperative transport network is a barrage relay network (BRN). A feature of barrage relay networks (BRNs) is the definition of an efficient protocol for broadcasting information throughout a network via a flooding mechanism that exploits cooperative communications at Layer 1. In particular, this cooperative scheme is completely autonomous in that nodes need not coordinate explicitly; rather, cooperative behavior emerges implicitly via intelligent signal design techniques at Layer 1.

Figure 3:
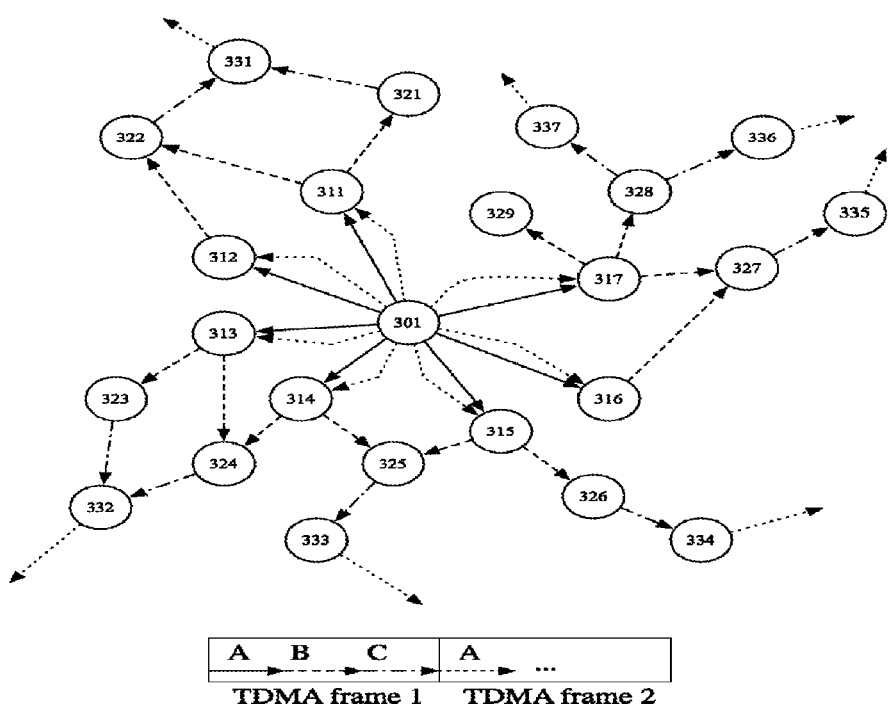
FIG. 3 is another example of a network topology according to one embodiment of a system for coordinating access to a barrage relay network.

FIG. 3 illustrates an embodiment of an ad hoc network where independent medium allocations are obtained via a time division multiple access (TDMA) scheme. Specifically, in the embodiment shown in FIG. 3, time is divided into frames, which are further divided into M≥3 slots per frame (M=3 slots per frame labeled "A", "B", and "C" are shown in FIG. 3). In one embodiment, the central node 301 transmits a packet on slot A of the first TDMA frame. In such an embodiment, all nodes that successfully receive this packet are, by definition, one hop away from the source. These "one-hop nodes" are labeled 311, 312, ... 317 in FIG. 3. The one-hop nodes transmit the same packet on slot B, thus relaying to nodes that are 2 hops away from the source ("two-hop nodes" 321, 322, ... 329), which in turn transmit the same packet on slot C. Nodes that are 3 hops away from the source ("three-hop nodes" 331, 332, ... 337) relay the packet on slot A of the second TDMA frame. In this way, packets transmit outward from the source. In some embodiments, to prevent the relay transmissions from propagating back towards the source, each node relays a given packet only once. For example, in one embodiment, one-hop nodes will receive the first broadcast packet on slot A (from the source) and again on slot C (from two-hop nodes) but only relay on slot B.

In the embodiment shown in FIG. 3, a number of two-hop nodes may receive a packet on the same slot from different one-hop nodes. In some embodiments, these packets do not collide due to the physical ("PHY") layer processing employed by BRNs. Specifically, BRNs employ a PHY layer that allows identical packets to be combined at the receiver in a manner analogous to multipath mitigation in traditional node receivers. For example, in some embodiments, the multiple, possibly time-shifted copies of the received signal that arise in BRNs can be processed at the receiver as if resulting not from different transmitting nodes, but from reflections off, for example, buildings when a single source transmits.

In some embodiments, one type of spatial reuse of time slots enables packets to be pipelined into the source for transmission every M slots ("spatial pipelining"). For example, in the embodiment shown in FIG. 3, the one-hop nodes will not receive the packet broadcast by the three-hop nodes during slot A of the second TDMA frame. Thus, the source can safely transmit a second packet during that slot. In this manner, a throughput of W/M can be achieved for broadcast in a BRN with a single source (where W is the capacity of a single point-to-point link and M is the "spatial reuse factor," which is defined as the interval in slots between successive source transmissions).

In some embodiments, no routing tables need to be maintained for broadcasting in BRNs. Further, in some embodiments, unicast and multicast transmission can also be achieved via the basic barrage relay mechanisms: all nodes relay packets but only intended destinations pass the decoded packet up the protocol stack.

In some embodiments, the barrage relay mechanism provides an efficient method for transmitting packets from a single source node. In other embodiments, in order to provide networking when multiple sources wish to transmit data via this mechanism, some form of access control is required. For example, one solution may be push-to-talk ("PTT"), in which an operator accesses the medium by keying down their node and collisions are resolved by standard manual operational protocols. For data transmissions that are transparent to the user, however, manual operator control may not be sufficient.

In some embodiments, the proposed protocol does not control access to single links on a hop-by-hop and packet-by-packet basis. Rather, the proposed protocol coordinates access to the barrage broadcast mechanism for multiple time slots and multiple hops in a manner that is reactive to both dynamic network topology and traffic conditions. In order to highlight this distinction, the term barrage access control (BAC) is adopted herein to denote the proposed mechanism for providing joint Layer 2/3 functionality in barrage relay networks.

Single-Flow Barrage Access Control Protocols

BAC protocols that permit at most one distinct data source per time slot are denoted single-flow ("SF-BAC"). In some embodiments, SF-BAC protocols time-multiplex network-wide broadcasts (flooding) from a set of source nodes (note that this set of source nodes changes over time in response to network traffic demands). In some embodiments, SF-BAC protocols provide joint Layer 2/3 functionality for unicast, multicast, and broadcast data. Only a single flow of data, however, is active in the network on any given time slot. Hence single-flow. Below, multiple-flow BAC protocols that permit multiple nodes to act as sources during the same time slot—i.e., protocols which control access to the barrage relay mechanism in both time and space—are described.

Multiple-Flow Barrage Access Control Protocols

Returning to the example network illustrated in FIG. 3, in some embodiments, data transmission occur where there are three unicast source-destination pairs: (1) nodes 312 (source) and 331 (destination); (2) nodes 317 and 336; and (3) nodes 324 and 332. In some embodiments, a single-flow BAC protocol would service these desired data flows by time multiplexing network-wide floods from nodes 312, 317, and 324, respectively.

This SF-BAC approach may be less efficient than a protocol that operates instead as follows:

On slot A of each TDMA frame, nodes 312, 317, and 324 transmit a packet. The packet transmitted by node 324 is received by its destination (node 332).

On slot B of each TDMA frame, node 322 relays the packet it received on slot A (from node 312). This packet is in turn received by its destination (node 331).

Simultaneously on slot B of each TDMA frame, node 328 relays the packet it received on slot A (from node 317). This packet is in turn received by its destination (node 336).

All other nodes do not relay on slots B or C.

In some embodiments, in order to simultaneously realize the efficiency of the protocol described above and the benefits of BRNs, some mechanism for spatially containing the extent of the basic barrage mechanism is required. In one embodiment, this may be accomplished by, for example, a Controlled Barrage Region ("CBR"). In one embodiment, a CBR can be established by specifying a set of buffer nodes around a plurality of nodes that includes the source ("S") and destination ("D") for a data transmission. In such an embodiment, the relay function of the buffer nodes is suppressed so that packets from other source nodes do not propagate into the CBR and packets from S do not propagate to the rest of the network.

Another embodiment for controlling the extent of packet transmission in a BRN employs two fields in the header (preamble) of each data packet: a time to live (TTL) field and a hop count (HC) field. The TTL field is unchanged by relaying nodes while the hop count field is set to 1 by the source of a given packet and incremented upon relay. Returning to the example of FIG. 3, in one embodiment, a TTL of 2 may be incorporated into the packets transmitted by node 301. In such an embodiment, the one-hop neighbors of this node would receive such packets and relay a modified packet with the HC field set to 2. Further, in such an embodiment, the two-hop neighbors would receive a packet with HC=2 and thus stop relaying (since the received HC field is equal to the TTL field). In some embodiments, because the change in the HC field depends on the distance from the source (in hops), each node at a given distance from the source will still receive multiple copies of identical packets.

In other embodiments, multiple-flow barrage access control ("MF-BAC") protocols employ mechanisms that enable a plurality of data sources to transmit on the same time slot. In this manner, a plurality of unicast/multicast flows can be active in the network on any given timeslot. In some embodiments, MF-BAC protocols can provide joint Layer 2/3 functionality for unicast and multicast data. In some embodiments, whenever a broadcast flow is active, no other flows may be active, even with a MF-BAC (i.e., MF-BAC and SF-BAC protocols may operate identically for broadcast data).

Multi-Packet Time-Multiplexing in BAC Protocols

In another embodiment of a SF-BAC protocol operating in the network illustrated in FIG. 3, there may be two source nodes that wish to broadcast data packets network-wide (for example nodes 332 and 336). In such an embodiment, it may be known that the network diameter is 10 hops. In one embodiment, access may be coordinated by: (1) on time slot 1, node 332 injects its first packet "$P_{332,1}$," into the network with a TTL of 10, this packet floods the network via the basic barrage relay mechanism in 10 slots; (2) on time slot 11, node 336 injects its first packet "$P_{336,1}$" with a TTL of 10; (3) on time slot 21 node 332 injects its second packet "$P_{332,2}$", and so on. Each source experiences a throughput of W/20 with this simple single-packet time-multiplexing scheme for a throughput of W/10.

In another embodiment, access may be to coordinate by time-multiplex access to the basic barrage relay mechanism in a multi-packet manner. For example, In one embodiment, source nodes 332 and 336 access the medium for N packets at a time (with a spatial reuse factor of M=3). In such an embodiment, access may be coordinated by:

On slots 1, 4, 7, . . . , 3*(N−1)+1, node 132 injects packets $P_{332,1}, P_{332,2}, \ldots, P_{332,N}$, respectively, into the network with a TTL of 10. These N packets flood the network via the spatially pipelined barrage relay mechanism so that packet $P_{332,N}$ has been received by all nodes in the network by slot T≡3*(N−1)+10.

On slots T+1, T+4, T+7, . . . , T+3*(N−1)+1, node 136 injects packets $P_{336,1}, P_{336,2}, \ldots, P_{336,N}$, respectively, into the network in a similar fashion. Packet $P_{336,N}$ has been received by all nodes in the network by slot T+3*(N−1)+10=2T.

On slots 2T+1, 2T+4, . . . , 2T+3*(N−1)+1, node 132 injects packets $P_{332,N+1}, P_{332,N+2}, \ldots, P_{332,2N}$ into the network, and so on.

In such an embodiment, each source experiences a throughput of W*N/(6*N+4) in this multi-packet time-multiplexing scheme. Further, in such an embodiment, as N becomes large, the sum throughput approaches the single-source limit of W/3. The overhead associated with switching between sources—i.e., waiting TTL slots rather than M slots before injecting a new packet for transmission—is minimized when the medium is accessed by a given source for multiple packets at a time.

System for Coordinating Access to a Barrage Relay Network

In some embodiments, nodes in a network can communicate over two mutually non-interfering classes of medium allocations: data and control. In some embodiments, mutual independence between data allocations is achieved via non-overlapping time slots (i.e., "time slotting"). When considered in aggregate, the data time slots are referred to as the data channel. Independence between the data and control channels can be achieved by a multitude of mechanisms including, but not limited to, time slotting, different frequency channels, different antenna radiation patterns, and low cross-correlation spreading sequences, as well as any combination of these techniques. Furthermore, in some embodiments, the control channel can be further sub-divided into a plurality of mutually independent sub-channels.

In some embodiments, the present invention may coordinate access to the data channel, which in some embodiments may be used for the transport of user data from source nodes to destination nodes. The coordination of data channel resources is performed via a BAC protocol that operates on the control channel (or channels).

There are a multitude of specific rule sets that can be used to define the operation of a BAC protocol. The BAC protocols disclosed herein employ Data Channel Schedules ("DCSs") that tabulate the state of each node with respect to the Data Channel ("DC") in the future. For example, each node in a network may maintain a DSC that defines whether that node is: (1) the source of a (possibly multi-) packet transmission ("S"); (2) the destination node ("D"); (3) an intermediate relay node ("R"); and/or (4) a node that is uninvolved ("U") in any transmission for some number of time slots into the future.

In some embodiments, SF-BAC protocols can be distinguished from MF-BAC protocols in that they allow at most one instance to be scheduled as a data source on any given time slot. MF-BAC protocols employ mechanisms to enable a plurality of nodes to be scheduled as sources on the same time slot.

Scheduling Data Channel Slots with a Notional SF-BAC Protocol

Figure 4:
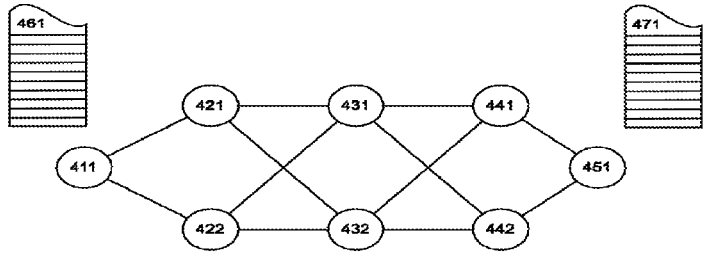
FIG. 4 is yet another example of a network topology according to one embodiment of a system for coordinating access to a barrage relay network.

FIG. 4 illustrates a sample network topology following the same graphical conventions used in FIGS. 1 and 2 (i.e., nodes are represented by circles and wireless links between pairs of nodes by lines). In the example network shown in FIG. 4, the two nodes labeled 411 and 451 seek to transmit data to one another. That is to say, there are two pending unicast transmissions: one from source node 411 to destination node 451 and a second from source node 451 to destination node 411. The queue of packets waiting for transmission at nodes 411 and 451 are labeled 461 and 471, respectively.

In some embodiments, in order to ensure fair sharing of resources, each node is permitted to reserve the transmission of up to 10 packets of data at once (the term "packet" is used to denote the amount of data that can fit into a single time slot for transmission). By restricting the size of consecutive time slots that can be reserved by a source node, delay inherent in transmission over a shared medium can be equitably distributed.

For example, in one embodiment node 411 may first request DC resources to transmit 10 packets of data. This could be accomplished, for example, via the SF-BAC protocol. The transmission of N packets with a time to live of L slots in a time-slotted BRN with spatial reuse factor M requires that $$M*(N-1)+L$$

consecutive DC time slots be reserved. In this example embodiment, N=10, M=3, and the time to live can be set to L=4. Therefore, 31 DC time slots must be reserved in order to support the multi-hop transmission of 10 packets of data from node 411 to node 451.

Figure 5:
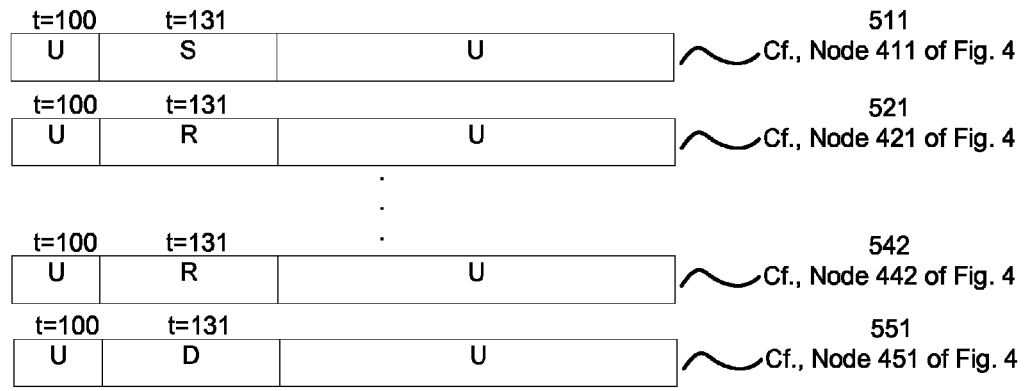
FIG. 5 is a graphical representation of an example data channel schedule according to one embodiment of a system for coordinating access to a barrage relay network.

In some embodiments, the SF-BAC protocol responds to the request from node 411 by updating the DCS at each of the nodes in the network. FIG. 5 provides an example embodiment of the DCS at the three types of nodes (source, relay, destination). In the embodiment shown in FIG. 5, the transmission from node 411 is scheduled to start at a time slot labeled t=100. In such an embodiment, the DCS's labeled 511, 521, 542, and 551 may correspond to nodes 411, 421, 442, and 451, respectively, of FIG. 4. In the embodiment shown in FIG. 5, the DCS's for all of the intermediate (relay) nodes are identical, thus only those for nodes 421 and 442 are shown in FIG. 5.

As shown in FIG. 5, the source node 511 is in a state labeled "S" in the time slots corresponding to the scheduled transfer, the relay nodes 521, 542 are in a state labeled "R", and the destination node 551 is in a state labeled "D." Time slots for which a transfer has not been scheduled are labeled "U" for uninvolved.

Figure 6:
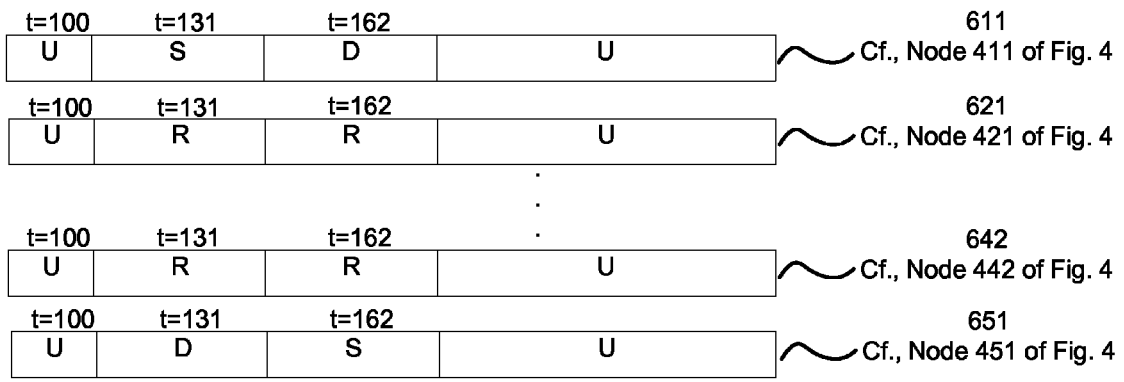
FIG. 6 is a graphical representation of an example data channel schedule according to another embodiment of a system for coordinating access to a barrage relay network.

Node 451 requests that the time slots required for a 10-packet transmission with it as the source node be reserved via the SF-BAC protocol. FIG. 6 illustrates the corresponding DCS updates. As shown in FIG. 6, the intermediate nodes (nodes 421, 422, 431, 432, 441, and 442) serve as relays for both transmissions, while nodes 411 and 451 take turns being source nodes.

In this embodiment, nodes 411 and 451 share the DC time slots in a round-robin manner that is transparent to the user. Thus, for example, if there is a bandwidth of W/M=2X available to a single source on the DC at any given time, then the average sum throughput achieved by nodes 411 and 451 will approach 2X.

A distinction between access protocols employing a BAC and traditional Layer 2/3 protocols is that in a BAC, access is coordinated for all hops and all packets of a multi-hop, multi-packet transmission all at once. Within each reserved set of consecutive DC time slots, the basic barrage relay mechanism is used to rapidly disseminate packets from the selected source node to the selected destination node(s). In some embodiments, in order to seamlessly support multicast and broadcast transmission, the relay function of destination ("D") nodes is not suppressed—i.e., only uninvolved ("U") nodes do not forward received packets according to the basic barrage relay mechanism.

Single-Flow BAC Protocol Description

In some embodiments, the SF-BAC protocol employs messages transmitted on two control sub-channels—the Request Sub-Channel ("RSC") and the Confirmation Sub-Channel ("CSC")—in order to coordinate access to the DC across a set of source nodes (which nodes wish to source data will change over time in response to network traffic demands). In some embodiments, both the RSC and CSC sub-channels employ the basic barrage relay broadcast mechanism in order to rapidly and reliably disseminate control messages throughout the network. Further, in some embodiments, each broadcast on the RSC and CSC sub-channels comprises a constant and finite time to live ("TTL").

In some embodiments, a node may schedule a data transmission by transmitting a Barrage ReQuest ("BRQ") message on the RSC comprising (1) the source UID, (2) the destination UID, and (3) the number of packets N requested for transmission. Whenever the Network Schedule Leader (hereinafter "NSL") receives a BRQ message, it transmits a corresponding Barrage Scheduling Confirmation (BSC) message on the CSC indicating (1) the source UID, (2) the destination UID, (3) the number of scheduled packets N, and (4) the start slot of the scheduled transmission. In some embodiments, each node in the network may be configured to use the information in the BSC message to update its schedule accordingly. In some embodiments, a constant spatial pipelining factor and constant TTL values are employed for all transmissions so that the end slot of a transmission is determined uniquely by the start slot and number of transmitted packets N.

In some embodiments, collisions of different BSC messages are avoided on the CSC since a single node (the Network Schedule Leader) transmits BSC messages. In other embodiments, since any node in the network can transmit on the RSC, collisions of BRQ messages from different sources can occur (e.g., whenever two nodes transmit BRQ messages on the same time slot). Collisions on the RSC channel between two different BRQ messages may lead to one or both not being received by the NSL node, in which case corresponding BSC messages on the CSC will not result. Since the TTL of any message on the RSC and CSC is finite, nodes that transmit or relay BRQ messages can detect the occurrence of collisions (i.e., if a BSC is not received within a prescribed number of time slots, it can be assumed to have not been transmitted by the NSL).

In some embodiments, two rules may be implemented by the network to limit and mitigate the effects of BRQ collisions on the RSC:

1. Whenever a node "X" receives a BRQ message on the RSC from another node "Y", node X suppresses its own BRQ transmissions until either (i) a BSC corresponding to the BRQ from node Y is received on the CSC, or (ii) a sufficient number of time slots (on the RSC) lapse such that it can be assumed that the corresponding BSC will not be received.
2. Any node X not receiving a BSC in response to a BRQ that it transmits within a prescribed maximum number of time slots assumes that the RSC is congested (i.e., collisions between BRQ messages from different sources are occurring) and backs off a random number of time slots before re-transmitting the BRQ.

In another embodiment, nodes may suppress the transmission of BRQ messages based on their local DCS. For example, in one embodiment an SF-BAC protocol may include a rule that limits the total number of DC slots that can be allocated to a given source in any given DSC. In another embodiment, an SF-BAC protocol may limit the total number of slots that can be scheduled over all sources. In still another embodiment, the minimum and maximum allowable size of a requested transfer (in terms of transmitted packets) may be controlled.

In yet another embodiment, the BRQ and BSC may be transmitted over a common control channel (i.e., there is no distinction between the RSC and CSC). In such an embodiment, if the rules defined above are applied, collisions between a BRQ message from a node X ("BRQ-X") and the BSC message corresponding to a request initiated by node Y ("BSC-Y") will occur only when node X did not previously receive the corresponding BRQ message from node Y ("BRQ-Y"). In such an embodiment, collisions between BRQ-X and BSC-Y can result in:

1. BRQ-X is not received by the NSL. In such an embodiment, node X may time out and retransmit BRQ-X.
2. BSC-Y is not received by node Y. In this case, node Y will time out and retransmit BRQ-Y. In such an embodiment, the DC time slots defined by the contents of BSC-Y may be wasted (i.e., no node will transmit on those slots).
3. BSC-Y is received by node Y but not by some subset of relaying/destination nodes, which will remain in the uninvolved ("U") state in the DC time slots defined by BSC-Y. In such an embodiment, an uninvolved node may not relay the data transmission from node X to node Y. However, the SF-BAC protocol can be modified so that any packet received in an U slot is relayed.

In another embodiment, the NSL is responsible only for generating BSC messages corresponding to broadcast and multicast traffic. In this embodiment, the destination node of a unicast transmission is responsible for generating the BSC message. In some embodiments, an SF-BAC protocol employing this technique enables increased throughput for one- and two-hop unicast transmissions. In such an embodiment, a Hop Count field in the BRQ message may be used to determine the distance (in hops) between a source and destination. In such an embodiment, the time-to-live and spatial reuse factor M of the scheduled transmission can then be set.

The Hidden Controlled Barrage Region Problem

In some embodiments, the SF-BAC protocol controls the spatial extent of one- and two-hop unicast transmissions via the TTL field of the packets on the DC. In some embodiments, CBRs can also be used to contain the spatial extent of unicast transmissions.

In one embodiment a MF-BAC protocol may employ CBRs. In such an embodiment, for example, all the time slots in the DCS may be one of the source ("S"), destination ("D"), relay ("R"), or uninvolved ("U") state. In such an embodiment, when a node schedules a new transfer, it may do so only in slots that were previously scheduled in the U state. In order to support CBRs, a fifth scheduled time slot state is defined: the buffer ("B") state. In some embodiments, the B state is identical to the U state with respect to relaying—i.e., nodes do not forward packets received during a B slots—but identical to the R state with respect to scheduling—i.e., new transfers cannot be scheduled in slots previously scheduled in the B state.

In another embodiment a SF-BAC protocol can serve as the basis for a MF-BAC protocol as follows:
1. When a source node "$r_S$" wishes to initiate a multi-packet unicast transmission to a destination node "$r_D$" it broadcasts a BRQ on the RSC containing an HC field. In such an embodiment, every node "$r_X$" in the network that receives this BRQ message thus ascertains its distance in hops from S, $d(r_S \rightarrow r_X)$.
2. Node "$r_D$" responds to the BRQ with a BSC message containing an HC field, and $d(r_S \rightarrow r_D)$ that is broadcast on the CSC.
3. Every node "$r_Y$" in the network that receives this BSC message thus ascertains its distance in hops from $r_D$, $d(r_D \rightarrow r_Y)$, as well as the source-destination distance $d(r_S \rightarrow r_D)$.
4. Upon receiving the BSC packet, any node "$r_R$" (other than $r_S$ and $r_D$) satisfying:

$$d(r_S \rightarrow r_R) + d(r_D \rightarrow r_R) = d(r_S \rightarrow r_D)$$

schedules the transfer defined by the BSC packet data in the relay state.
5. Upon receiving the BSC packet, any node "$r_B$" satisfying:

$$d(r_S \rightarrow r_B) + d(r_D \rightarrow r_B) = d(r_S \rightarrow r_D) + 1$$

schedules the transfer defined by the BSC packet data in the buffer state.
6. Upon receiving the BSC packet, any node "U" satisfying:

$$d(r_S \rightarrow r_U) + d(r_D \rightarrow r_U) > d(r_S \rightarrow r_D) + 1$$

does not update its DCS.

Figure 7:
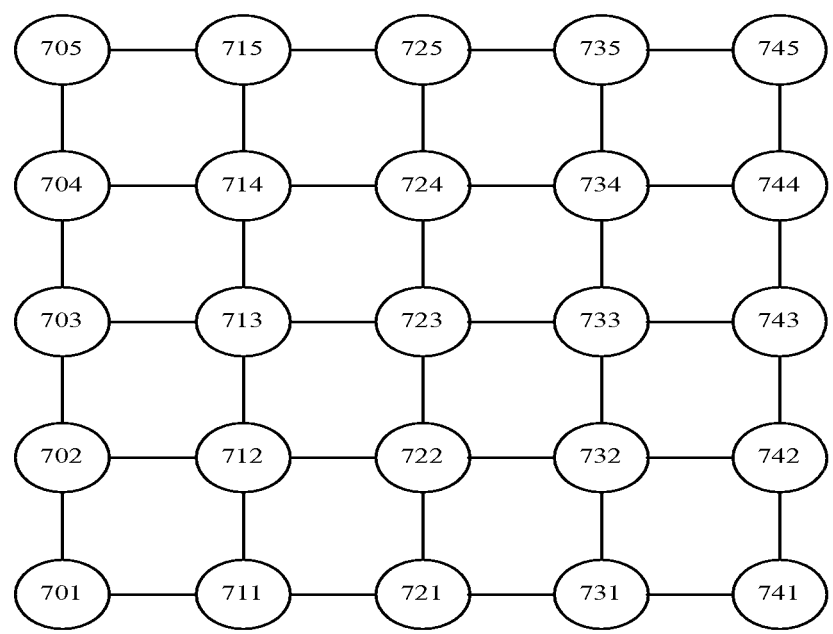
FIG. 7 is an example of a network topology according to one embodiment of a system for coordinating access to a barrage relay network.

FIG. 7 illustrates a sample network topology following the same graphical conventions used in FIGS. 1 and 2 (i.e., nodes are represented by circles and wireless links between pairs of nodes by lines). In one embodiment, nodes 701 and 705 are the source and destination, respectively, for one unicast transmission while nodes 741 and 745 are the source and destination, respectively, for a second unicast transmission. In such an embodiment, node 701 may first transmit a BRQ message on the RSC and node 705 may respond with a BSC message on the CSC that results in (i) node 705 scheduling a transfer in the D state beginning at slot t=100; (ii) node 701 scheduling the same transfer in S state; (iii) nodes 702, 703, and 704 scheduling in the R state; and (iv) nodes 711, 712, 713, 714, and 715 scheduling in the B state. In such an embodiment, following a BRQ/BSC exchange between nodes 741 and 745, a transfer beginning at slot t=100 can also be scheduled with node 741 in the S state; 745 in the D state; 742, 743, and 744 in the R state; and 731, 732, 733, 734, and 735 in the B state. In this manner, two spatially separated flows may be scheduled simultaneously.

Further, in another embodiment, the two source-destination pairs are instead nodes 703, 743 and 731, 735. In such an embodiment, a BRQ/BSC exchange between 703 and 743 first schedules the appropriate nodes in the appropriate states starting at time t=100. For example, when node 735 receives a BRQ from node 731, it may respond with a BSC indicating that the transfer should begin at time t=100, even though this transfer conflicts with the previously scheduled transfer from 703 to 743 (e.g., node 723 is a relay for the CBR between 703 and 743 and between 731 and 735). This error results because the scheduled 703→743 CBR is "hidden" from node 735.

Three-Phase MF-BAC Protocol Description

In some embodiments, the scheduling errors that arise from the hidden CBR problem can be alleviated via a three phase protocol as follows:
1. When a source node "$r_S$" initiates a multi-packet unicast transmission to a destination node "$r_D$" it broadcasts a BRQ on the RSC containing a HC field. Every node "$r_X$" in the network that receives this BRQ message thus ascertains its distance in hops from S, $d(r_S \rightarrow r_X)$.
2. Node "$r_D$" responds to the BRQ with a Barrage EXplore (BEX) message containing an HC field, $d(r_S \rightarrow r_D)$ and a potential start time for the transfer, as ascertained by $r_D$.
3. Nodes only relay the BEX message if the time slots required for a scheduled transfer are currently uninvolved in other transfers.
4. Every node "$r_Y$" in the network that receives this BEX message thus ascertains its distance in hops from $r_D$, $d(r_D \rightarrow r_Y)$ and the source-destination distance $d(r_S \rightarrow r_D)$.
5. If $r_S$ does not receive the BEX message, then a scheduling conflict is assumed and $r_S$ backs off a random number of time slots before initiating a subsequent request.
6. If $r_S$ does receive the BEX message, then there exists a CBR from $r_S$ to $r_D$ that can be scheduled according to the data in the BEX message without conflicting with previous CBRs. The third phase of the protocol then begins: $r_S$ transmits a BSC message. Those nodes which previously relayed BEX messages then schedule the transfer per the SF-BAC protocol described above.

This three phase MF-BAC protocol solves the hidden CBR problem at the expense of increasing the number of messages that must be transmitted on the control channel per data transfer.

Figure 8:
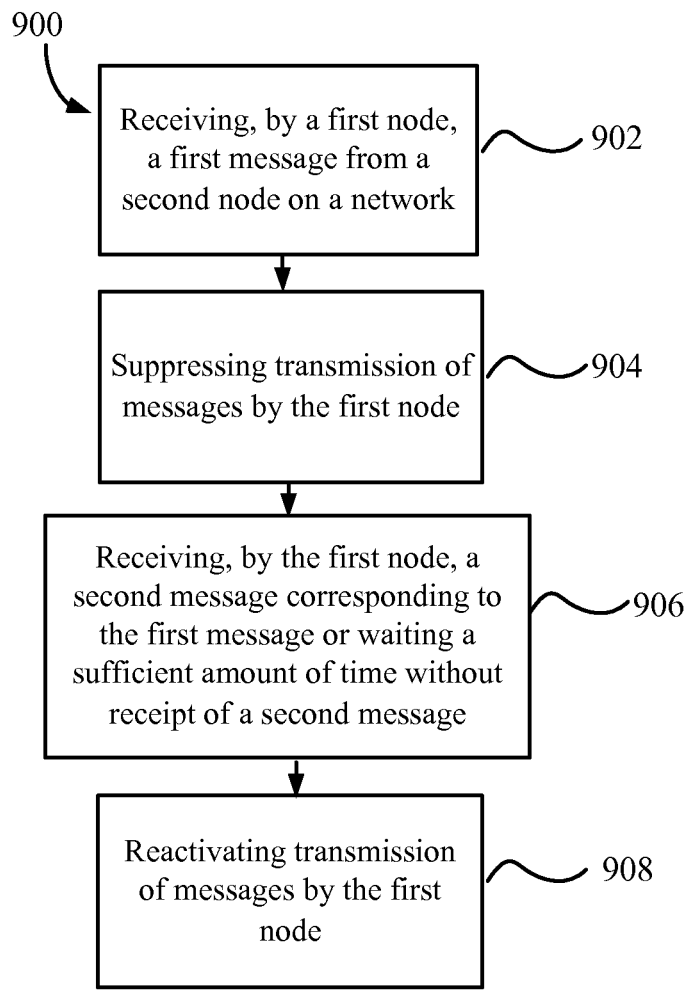
FIG. 8 is flow chart for a method for coordinating access to a barrage relay network, according to one embodiment of the present invention.

FIG. 8 is flow chart for a method for coordinating access to a barrage relay network according to one embodiment of the present invention. In some embodiments, the order of steps in flow chart 900 may be changed. Further, some of the steps shown in flow chart 900 may be skipped or additional steps added.

As shown in FIG. 8, the method 900 begins at 902 when a first node receives a first message from a second node. In some embodiments, the two nodes submit channels on two sub-channels (the RSC and the CSC). In another embodiment, a BRQ and BSC may be transmitted over a common control channel (i.e., there is no distinction between the RSC and CSC). In some embodiments, the first message comprises a BRQ message transmitted on the RSC.

The method continues at step 904, by suppressing transmission of messages from the first node. For example, in some embodiments, suppressing transmission of messages comprises preventing the first node from transmitting of BRQ messages.

At step 906, the first node receives a second message corresponding to the first message or waits a sufficient amount of time without receipt of a second message. For example, in one embodiment, the second message may comprise a BSC message corresponding to the first message that is received on the CSC. Further, in some embodiments, a sufficient amount of time may comprise a number of time slots on the RSC, such that it can be assumed that a corresponding BSC will not be received. This sufficient amount of time may have passed because, for example, the corresponding BSC was not transmitted due to an error or the corresponding BSC collided with another transmission on the network. At step 908, transmission of the messages from the first node is reactivated.

Figure 9:
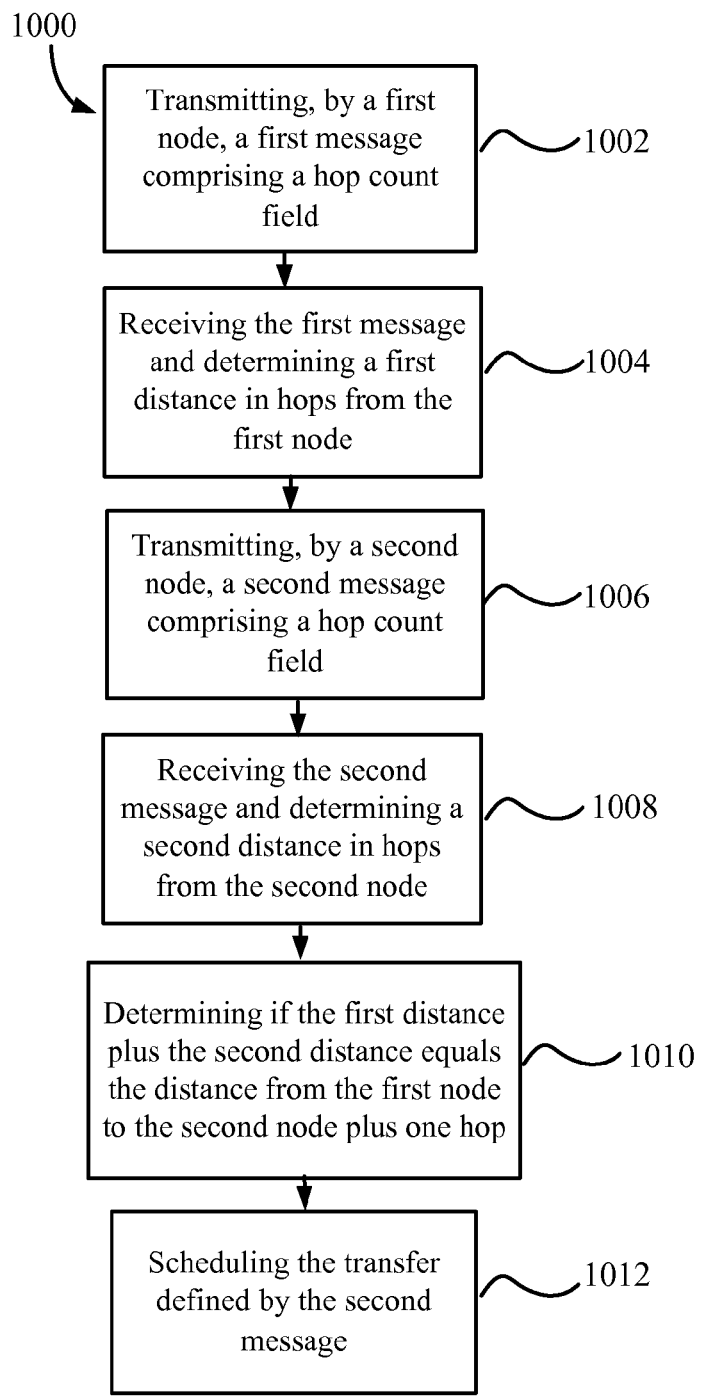
FIG. 9 is another flow chart for a method for coordinating access to a barrage relay network, according to one embodiment of the present invention.

FIG. 9 is another flow chart for a method for coordinating access to a barrage relay network according to one embodiment of the present invention. In some embodiments, the order of steps in flow chart 1000 may be changed. Further, some of the steps shown in flow chart 1000 may be skipped or additional steps added.

As shown in FIG. 9, the method 1000 begins at 1002, when a first node transmits a first message comprising a HC field. In some embodiments, the HC field may comprise a field to measure the number of hops (i.e. the number of nodes) that the message has passed through.

The method continues at step 1004, when the first message is received by a node that determines a first distance in hops from the first node. In some embodiments, the two nodes transmit messages on two sub-channels (the RSC and the CSC). In another embodiment, the BRQ and BSC may be transmitted over a common control channel (i.e., there is no distinction between the RSC and CSC). In some embodiments, the first message comprises a BRQ message transmitted on the RSC.

At step 1006, a second node transmits a second message comprising a HC field. In some embodiments, this second message may comprise a BSC message broadcast on the CSC, and corresponding to the first message.

At step 1008, the second message is received by a node that determines a second distance in hops from the second node. In some embodiments, the distance may be measured in hops.

At step 1010, it is determined if the first distance plus the second distance is greater than the distance from the first node to the second node plus one hop.

Then at step 1012, a transfer of a plurality of data messages is scheduled according to the contents of the second control message. For example, in one embodiment, the DSC time slots corresponding to data transfer may be defined by the BSC packet data as being in the buffer state.

Figure 10:
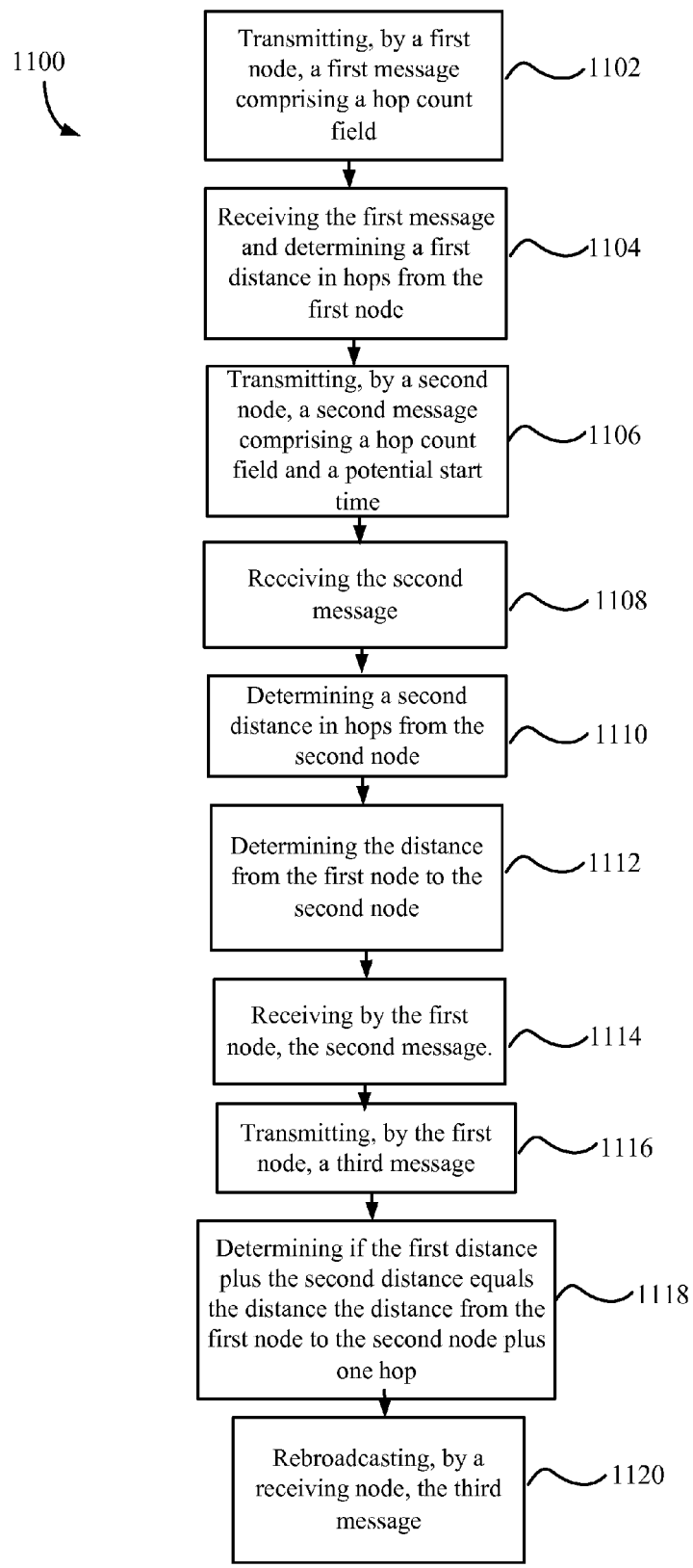
FIG. 10 is yet another flow chart for a method for coordinating access to a barrage relay network, according to one embodiment of the present invention.

FIG. 10 is another flow chart for a method for coordinating access to a barrage relay network according to one embodiment of the present invention. In some embodiments, the order of steps in flow chart 1100 may be changed. Further, some of the steps shown in flow chart 1100 may be skipped or additional steps added.

As shown in FIG. 10, the method 1100 begins at 1102, when a first node transmits a first message comprising a HC field. In some embodiments, the HC field may comprise a field to measure the number of hops (i.e. the number of nodes) that the message has passed through.

The method continues at step 1104, when the first message is received by a node that determines a first distance in hops from the first node. In some embodiments, the two nodes transmit messages on two sub-channels (the RSC and the CSC). In another embodiment, the BRQ and BSC may be transmitted over a common control channel (i.e., there is no distinction between the RSC and CSC). In some embodiments, the first message comprises a BRQ message transmitted on the RSC.

At step 1106, a second node transmits a second message comprising a HC field and a potential start time. In some embodiments, the second message may comprise a Barrage EXplore (BEX) message. Further, in some embodiments, the potential start time may be determined by the number of hops between the first node and the second node. For example, in one embodiment, the potential start time may be set to the earliest time slot that that the BEX message could reach the second (destination) node, as determined by number of hops between the first node and a second node.

At step 1008, the second message is received. At step 1110, a distance in hops from the second node is determined. At step 1112, the distance from the first node to the second node is determined. In some embodiments, the distance may be measured in hops.

At step 1114, the first node receives the second message.

At step 1116, the first node transmits a third message. In some embodiments, the third message may comprise a BSC message.

At step 1118, it is determined if the first distance plus the second distance is greater than the distance from the first node to the second node plus one hop.

At step 1120, a receiving node rebroadcasts the third message.

Figure 11:
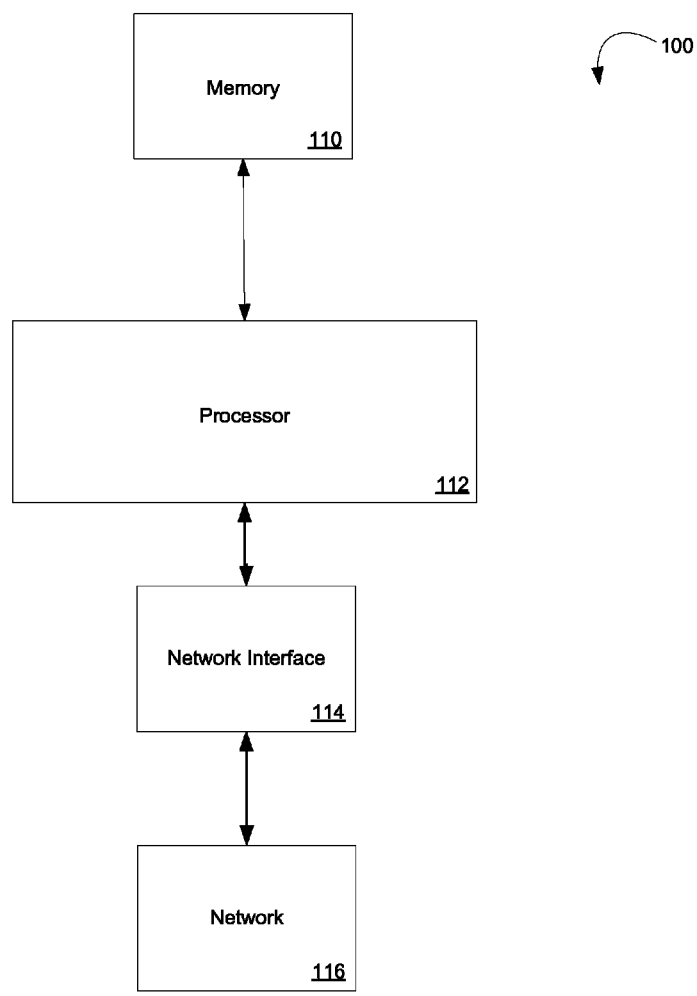
FIG. 11 is a block diagram of a system for coordinating access to a barrage relay network, according to one embodiment of the present invention.

FIG. 11 is a block diagram of a device implemented as a node for coordinating access to a barrage relay network according to one embodiment of the present invention. As shown in FIG. 11, the system 100 comprises a memory 110, a processor 112, a network interface 114, and a network 116.

The processor 112 is configured to execute computer-executable program instructions stored in memory 110. For example, processor 112 may execute one or more computer programs for coordinating access to a network in accordance with embodiments of the present invention. Processor 112 may comprise a microprocessor, a digital signal processor (DSP), an application-specific integrated circuit (ASIC), one or more field programmable gate arrays (FPGAs), state machines, or the like. Processor 112 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 110 comprises a computer-readable medium that stores instructions that when executed by processor 112, cause processor 112 to perform various steps, such as those described herein. Examples of computer-readable media include, but are not limited to, an electronic, optical, magnetic, or other storage or transmission devices capable of providing processor 112 with computer-readable instructions. Other examples of computer-readable media comprise, but are not limited to, a floppy disk, CD-ROM, magnetic disk, memory chip, ROM, RAM, ASIC, configured processor, all optical media, all magnetic tape or other magnetic media, or any other medium from which a computer processor can access data. In addition, various other devices may include computer-readable media such as a router, private or public network, or other transmission devices. The processor 112 and the processing described may be in one or more structures, and may be dispersed throughout one or more structures.

Processor 112 is in communication with the network interface 114. The network interface 114 may comprise one or more network connections. Network interface 114 connects processor 110 to network 116. Network 116 may be one of many types of networks known in the art. For example, network 116 may comprise a wired or wireless network, such as a BRN.

GENERAL CONSIDERATIONS

For the purposes of this specification, unless otherwise indicated, all numbers used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

While the present subject matter will be described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

It is further noted that, as used in this specification, the singular forms "a," "an," and "the" include plural referents unless expressly and unequivocally limited to one referent.

That which is claimed is:

1. A method for coordinating access to a barrage relay network comprising:
   receiving, at a first node, a first copy of a request message from a second node on the barrage relay network;
   receiving, at the first node, a second copy of the request message from a third node on the barrage relay network;
   combining, at the first node, the first copy and the second copy of the request message;
   suppressing, at the first node, transmission of request messages by the first node;
   receiving, at the first node, a confirmation message corresponding to the request message or waiting a period of time without receipt of the confirmation message; and
   reactivating, at the first node, transmission of the request messages by the first node.

2. The method of claim 1, wherein the period of time is a number of timeslots on a request sub-channel.

3. The method of claim 1, wherein both the request message and the confirmation message are transmitted over a common control channel.

4. The method of claim 1, wherein the barrage relay network comprises two channels.

5. The method of claim 4, wherein the barrage relay network comprises a data channel.

6. The method of claim 4, wherein the barrage relay network comprises a control channel.

7. The method of claim 6, wherein the control channel comprises one or more independent sub-channels.

8. The method of claim 7, wherein the control channel comprises a request sub-channel and a confirmation sub-channel.

9. The method of claim 8, wherein the request message is received on the request sub-channel.

10. The method of claim 8, wherein the confirmation message is received on the confirmation sub-channel.

11. A method for coordinating access to a barrage relay network comprising:
    transmitting, from a first node, a request message comprising a first hop count field;
    receiving, at a second node, the request message and determining a first distance in hops from the first node to the second node;
    transmitting, from the second node, the request message comprising the first hop count field;
    receiving, at a third node, the request message and determining a second distance in hops from the first node to the third node;
    transmitting, from the third node, a confirmation message comprising a second hop count field and the second distance;

receiving, at the second node, the confirmation message and determining a third distance in hops from the third node to the second node;

receiving, at the first node, the confirmation message; and thereafter initiating a data transmission from the first node to the third node, wherein a state of the second node for relaying the data transmission is determined based on the first distance, the second distance, and the third distance.

12. The method of claim 11, further comprising:
determining, at the second node, if the first distance plus the third distance is greater than the second distance.

13. The method of claim 12, further comprising:
scheduling, at the third node, the data transmission, wherein the data transmission schedule is defined in the confirmation message.

14. The method of claim 11, wherein the barrage relay network comprises two channels.

15. The method of claim 14, wherein the barrage relay network comprises a data channel.

16. The method of claim 14, wherein the barrage relay network comprise a control channel.

17. The method of claim 16, wherein the control channel comprises one or more independent sub-channels.

18. The method of claim 17, wherein the control channel comprises a request sub-channel and a confirmation sub-channel.

19. The method of claim 18, wherein the request message is transmitted on the request sub-channel.

20. The method of claim 18, wherein the confirmation message is transmitted on the confirmation sub-channel.

21. A method for coordinating access to a barrage relay networking comprising:
transmitting, from a first node, a request message comprising a first hop count field;
receiving, at a second node, the request message and determining a first distance in hops from the first node to the second node;
transmitting, from the second node, the request message comprising the first hop count field;
receiving, at a third node, the request message and determining a second distance in hops from the first node to the third node;
transmitting, from the third node, an exploration message comprising a second hop count field, the second distance, and a schedule for a data transmission;
receiving, at the second node, the exploration message and determining a third distance in hops from the third node to the second node; and
transmitting, from the second node, the exploration message based on the first distance, the second distance, and the third distance, wherein:
if the exploration message is received at the first node, initiating the data transmission from the first node to the third node, and
if the exploration message is not received at the first node, retransmitting, from the first node, the request message comprising the first hop count field.

22. The method of claim 21, wherein the barrage relay network comprises a data channel and a control channel.

23. The method of claim 22, wherein the control channel comprises a request sub-channel and a confirmation sub-channel.

24. The method of claim 23, wherein the request message is transmitted on the request sub-channel.

25. The method of claim 21, further comprising:
transmitting, from the first node, a confirmation message;
transmitting, from the second node, the confirmation message, if the first distance plus the third distance is less than or equals the second distance plus one hop; and
receiving, at the third node, the confirmation message.

26. The method of claim 25, wherein the confirmation message is transmitted on a confirmation sub-channel.

* * * * *